(12) United States Patent
Strömer et al.

(10) Patent No.: US 8,059,247 B2
(45) Date of Patent: Nov. 15, 2011

(54) ELECTRODE STRUCTURE FOR AN LCD DEVICE

(75) Inventors: Jan Frank Strömer, Eindhoven (NL); Nathalie Magali Danielle Dessaud, Eindhoven (NL)

(73) Assignee: Chimei Innolux Corporation (TW)

( * ) Notice: Subject to any disclaimer, the term of this patent is extended or adjusted under 35 U.S.C. 154(b) by 388 days.

(21) Appl. No.: 12/347,590

(22) Filed: Dec. 31, 2008

(65) Prior Publication Data

US 2009/0174853 A1    Jul. 9, 2009

Related U.S. Application Data

(60) Provisional application No. 61/019,597, filed on Jan. 7, 2008.

(30) Foreign Application Priority Data

Sep. 5, 2008    (EP) ..................................... 08163771

(51) Int. Cl.
G02F 1/1343    (2006.01)
(52) U.S. Cl. ........................ 349/144; 349/139
(58) Field of Classification Search ................... 349/144
See application file for complete search history.

(56) References Cited

U.S. PATENT DOCUMENTS

| | | | |
|---|---|---|---|
| 6,459,465 B1 | 10/2002 | Lee | |
| 6,525,798 B1 | 2/2003 | Yamakita et al. | |
| 6,630,979 B2 | 10/2003 | Yang | |
| 6,765,642 B2 | 7/2004 | Lee | |
| 6,812,986 B2 * | 11/2004 | Takatori et al. | 349/141 |
| 6,917,406 B2 * | 7/2005 | Yang | 349/139 |
| 7,102,712 B2 * | 9/2006 | Anno et al. | 349/113 |
| 7,187,425 B2 * | 3/2007 | Yamazaki | 349/146 |
| 7,199,852 B1 * | 4/2007 | Lu et al. | 349/141 |
| 7,212,270 B2 * | 5/2007 | Takatori et al. | 349/144 |
| 7,405,796 B2 * | 7/2008 | Lu et al. | 349/141 |
| 7,460,202 B2 * | 12/2008 | Horiguchi et al. | 349/145 |
| 7,528,910 B2 * | 5/2009 | Tsuchiya | 349/114 |
| 7,612,848 B2 * | 11/2009 | Takatori et al. | 349/113 |
| 7,855,769 B2 * | 12/2010 | Dong | 349/129 |

(Continued)

FOREIGN PATENT DOCUMENTS

CN    1696803    11/2005

(Continued)

OTHER PUBLICATIONS

Kim et al.; "Dynamic Stability of Disclination Lines in Fringe-Field Switching Mode with a Wedge-Shaped Common Electrode"; Japanese Journal of Applied Physics; vol. 45, No. 2A; 2006; pp. 883-886.

(Continued)

*Primary Examiner* — Rhonda Peace
(74) *Attorney, Agent, or Firm* — Lowe Hauptman Ham & Berner, LLP (57) ABSTRACT

A liquid crystal display device has pixels, and each pixel has a lower substrate and an upper substrate with a liquid crystal material in between. The each pixel also has an electrode structure between the lower substrate and the upper substrate. The electrode structure has electrodes, and each electrode has a polygon-shaped electrode surface and a plurality of electrode edges. The electrodes are arranged such that if an electrode edge is facing an electrode edge of an adjacent electrode then the electrode edge and the electrode edge of the adjacent electrode define a distance which is substantially constant along the entire electrode edge.

8 Claims, 9 Drawing Sheets

U.S. PATENT DOCUMENTS

| | | | |
|---|---|---|---|
| 2002/0021394 A1* | 2/2002 | Kressmann et al. | 349/139 |
| 2003/0179333 A1* | 9/2003 | Kim | 349/139 |
| 2005/0041188 A1* | 2/2005 | Yamazaki | 349/146 |
| 2005/0195353 A1* | 9/2005 | Park et al. | 349/139 |
| 2005/0231674 A1* | 10/2005 | Nishimura | 349/139 |
| 2005/0237465 A1* | 10/2005 | Lu et al. | 349/141 |
| 2005/0243231 A1* | 11/2005 | Horiguchi et al. | 349/43 |
| 2006/0055862 A1 | 3/2006 | Choi | |
| 2006/0061723 A1 | 3/2006 | Mori et al. | |
| 2006/0139546 A1 | 6/2006 | Lee | |
| 2006/0146248 A1 | 7/2006 | Park | |
| 2007/0026556 A1 | 2/2007 | Kitagawa et al. | |
| 2007/0165172 A1* | 7/2007 | Takatori et al. | 349/139 |
| 2007/0195251 A1* | 8/2007 | Lu et al. | 349/143 |
| 2010/0066964 A1* | 3/2010 | Takatori et al. | 349/139 |

FOREIGN PATENT DOCUMENTS

| | | |
|---|---|---|
| GB | 2421832 | 7/2006 |
| JP | 2002-221730 | 1/2001 |
| KR | 10-2005-0059810 | 12/2003 |
| WO | 2006118752 | 11/2006 |

OTHER PUBLICATIONS

European Search Report of European patent application 08163771.

Office Action from corresponding Chinese Application No. 200910000367.2 issued on Apr. 1, 2011.

* cited by examiner

ELECTRODE STRUCTURE FOR AN LCD DEVICE

CROSS REFERENCE TO RELATED APPLICATIONS

This application claims the benefit of U.S. Provisional Application No. 61/019,597, filed Jan. 7, 2008, and claims priority of European Patent Application No. 08163771.2, filed Sep. 5, 2008, the entirety of which are incorporated by reference herein.

BACKGROUND OF THE INVENTION

1. Field of the Invention

The present invention relates to in-plane switching and fringe field switching liquid crystal display (IPS-LCD) devices.

2. Description of the Related Art

U.S. Pat. No. 6,459,465 discloses an IPS-LCD device which has pixel electrodes and common electrodes which are formed in substantially zigzag patterns.

WO-A2-2006/118752 discloses an IPS-LCD device comprising chevron-shaped common electrodes and chevron-shaped pixel electrodes, which are arranged in an alternating manner to form a multi-domain liquid crystal distribution.

U.S. Pat. No. 6,917,406 discloses an IPS-LCD device with a comb-shaped common electrode and a comb-shaped pixel electrode. The teeth of these electrodes, which can for instance be obtained by lengthwise linking of trapezoids or inverted trapezoids, thus create teeth provided with a saw-tooth structure.

U.S. Pat. No. 7,199,852 discloses a fringe field switching liquid crystal display (FFS-LCD). Comb-shaped common electrodes and pixel electrodes have symmetric teeth provided with trapezoid parts extending periodically from both sides of the teeth. The interdigitating teeth of the common electrode and the pixel electrode have their trapezoid parts shifted half a period with respect to one another.

Thus, many different shapes of electrodes have been tried in the past for improving the properties of these IPS-LCD devices.

BRIEF SUMMARY OF THE INVENTION

The invention aims to provide an alternative electrode structure for LCD devices.

In an embodiment, an alternative object of the invention is to improve IPS-LCD and/or FFS-LCD devices.

In an embodiment, an alternative object of the invention is to provide an IPS-LCD and/or FFS-LCD device with a better viewing angle.

In an embodiment, an alternative object of the invention is to provide an IPS-LCD and/or FFS-LCD device with a better faster response.

In an embodiment, according to a first aspect of the invention this is realized with a liquid crystal display having pixels, wherein each pixel comprises a lower substrate and an upper substrate with a liquid crystal material in between, and each pixel also comprises an electrode structure between the lower substrate and the upper substrate. The electrode structure comprises electrodes. Each electrode has a polygon-shaped electrode surface and a plurality of electrode edges. The electrodes are arranged such that if an electrode edge is facing an electrode edge of an adjacent electrode then the electrode edge and the electrode edge of the adjacent electrode define a distance which is substantially constant along the entire electrode edge.

In another embodiment, according to a second aspect of the invention this is realized with an electronic device comprising the liquid crystal display device as described above.

The polygon surfaces, their mutual positioning and coupling to a voltage source allows a better control of the electrical field in an IPS-LCD or FFS-LCD device. In particular, some of the configurations within the scope of the invention provide a better control of the viewing angle or a better response for FFS-type LCD devices.

The electrode surfaces form areas provided with conducting material in such a way as to form electrodes. This can be done in manners which are well known to a person skilled in the art of making electrodes in LCD devices. To that end, techniques known in the field of chip production can be used. This will not further be explained in this context and is considered to be known to a person skilled in the art.

The LCD device of the current invention can be used in various types of LCD devices, like transflective, reflective, transmissive displays, TV displays, displays for mobile phones and similar electronic devices like PDA's.

The various aspects discussed in this patent can be combined in order to provide additional advantages. Various aspects disclosed in this description can form the basis of one ore more divisional patents.

A detailed description is given in the following embodiments with reference to the accompanying drawings.

BRIEF DESCRIPTION OF THE DRAWINGS

The invention will be further elucidated referring to several embodiments of an IPS-LCD device and a FFS-LCD device having electrode structures shown in the attached drawings, showing in.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The proposed electrode structure of the invention can be beneficial for In-Plane Switching (IPS-LCD) and for Fringe Field Switching liquid crystal devices (FFS-LCD).

The IPS technology shows an improved viewing angle compared to the twisted nematic and the vertical aligned technology. The in-plane switching is realised by a striped inter-digital finger electrode structure on a bottom substrate. No electrodes are required on the top substrate. This is further illustrated in FIG. 1.

Figure 1:
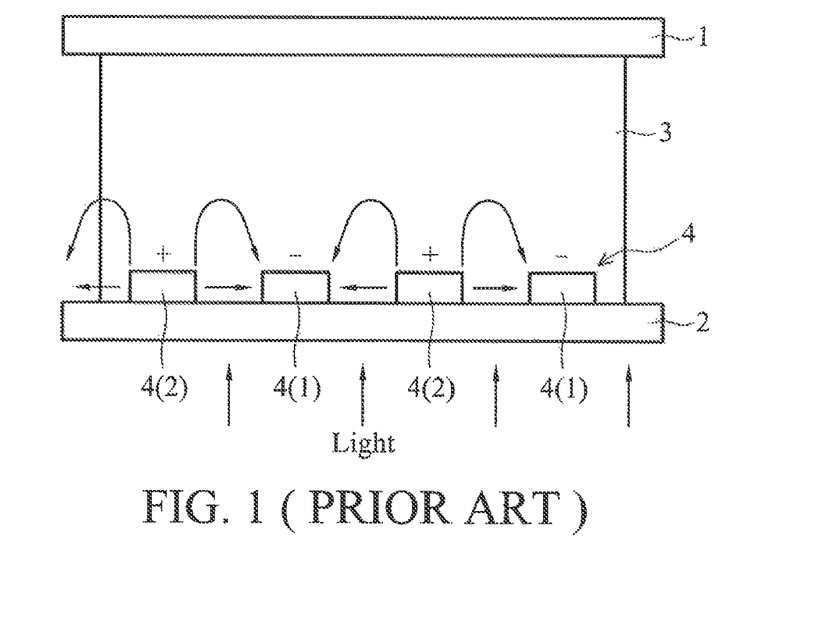
FIG. 1 a schematic cross section of an IPS-LCD device showing the most general features of these types of devices.

In FIG. 1, a schematic cross section of an IPS-LCD device showing the most general features of these types of devices is shown.

IPS-LCD devices generally have a layer of liquid crystal material 3 provided between two substrate layers 1, 2 often made of glass or of a transparent polymer material. Usually, there is an upper transparent substrate 1 and a lower transparent substrate 2. Electrodes 4 for switching, i.e. changing the orientation of the liquid crystals in the liquid crystal material 3, are provided on or near one of the substrate layers 1, 2 and in-plane or substantially in-plane with that one of the substrate layers 1, 2. Usually these electrodes 4 are arranged as interdigital finger electrodes, for providing separate electrodes having mutually different voltages. Usually, these fingers electrodes have alternately different potentials or are at different voltages. This is shown in FIG. 1 where a first group of finger electrodes 4(1) is at a first voltage level and a second group of finger electrodes 4(2) is at a second voltage level. The first voltage level may be lower than the second voltage level, as shown, thus creating an electronic field directed from the second group of finger electrodes 4(2) to the first group of finger electrodes 4(1). This electric field has electric field lines mainly oriented parallel to the substrate layer 2.

The (nematic) liquid crystal material 3 is planarly aligned between the two substrate layers 1, 2 often using a polymer alignment layer. Generally, crossed linear polarizers are often positioned on the substrate layers, whereby one of the linear polarizers has an optical polarizer axes aligned with the rubbing direction of the liquid crystal material 3 to provide a dark state when there is no voltage applied to the finger electrodes 4. If an electric field is generated between the inter-digital finger electrodes 4(1) and 4(2) in a pixel the liquid crystal material in that pixel distorts (twists). This results in a phase shift of in-coupled light entering the device at the lower substrate layer 2 and the pixel appears bright.

Other features of these IPS-LCD devices are well known to a person skilled in the art and will not be discussed further.

One drawback of the IPS technology is that the electric field in the area just above the electrodes 4 is very weak, which means that the liquid crystal material 3 will get only weakly distorted in this area and hence the transmission in this area is lower.

Therefore, recently a new technology called "Fringing Field Switching (FFS) has been developed that is similar to IPS, but has a better transmission above the electrodes 4. The FFS structure has an additional common electrode underneath a finger structure, separated by an isolation layer as will be explained in further detail with reference to FIG. 2.

Figure 2:
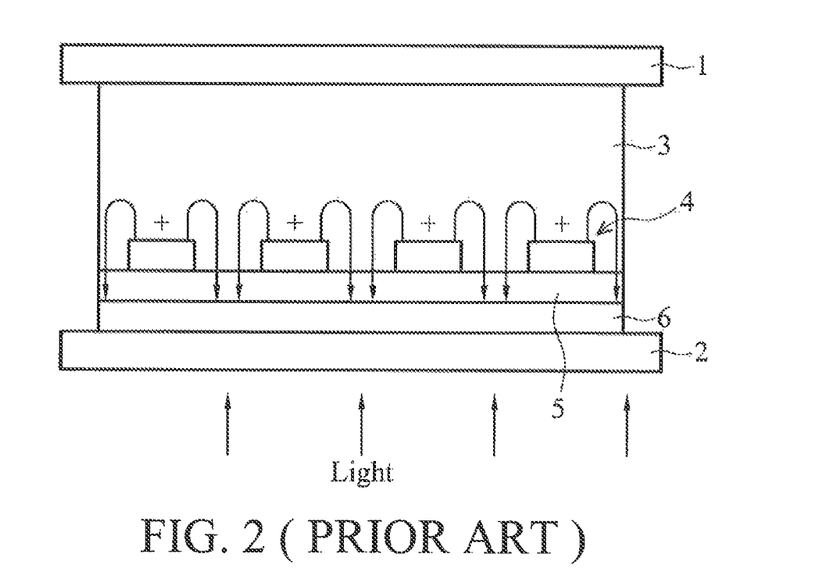
FIG. 2 a schematic cross section of an FFS-LCD device showing the most general features of these types of devices.

FIG. 2 shows a schematic cross section of an FFS-LCD device showing the most general features of these types of devices. These FFS-LCD devices are like IPS-LCD devices but in this case one electrode is a common electrode 6 which is provided on the surface of a substrate, usually the lower substrate 2. An insulating layer 5 is provided over the common electrode 6 for electronically separating common electrode 6 from the electrodes 4. Such electrodes 4 are commonly referred to as "pixel electrodes" which all have substantially the same potential. In fact, usually the insulating layer 5 covers substantially the entire lower substrate 2.

In the FFS LCD, the electric field is applied between the pixel electrodes 4 and the common electrode 6. This generates a fringing field (cf. FIG. 2) and also the areas above the electrodes 4 get distorted. The FFS technology has the advantage of a larger transmission of light compared to the IPS technology. However, it requires additional lithography steps.

Again, further features of these FFS-LCD devices are well known to a person skilled in the art and will not be explained in detail here.

Figure 3:
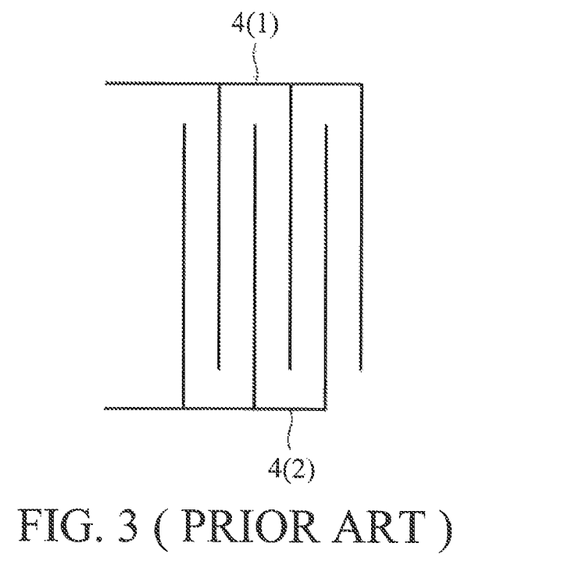
FIG. 3 a schematic drawing of a general FFS electrode structure.
Figure 4:
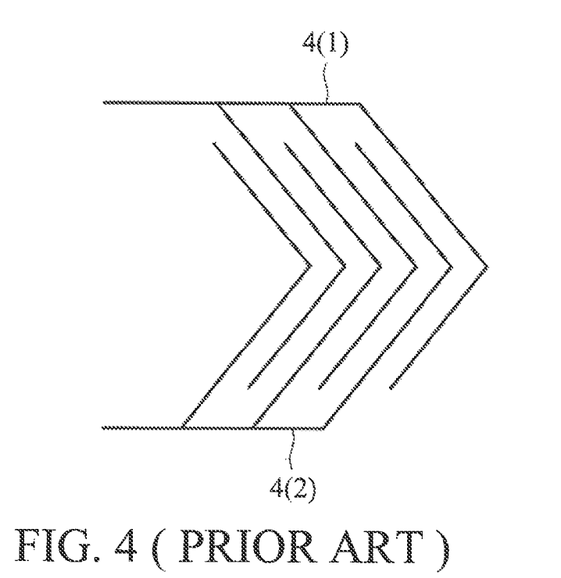
FIG. 4 a schematic drawing of another general FFS electrode structure.
Figure 5:
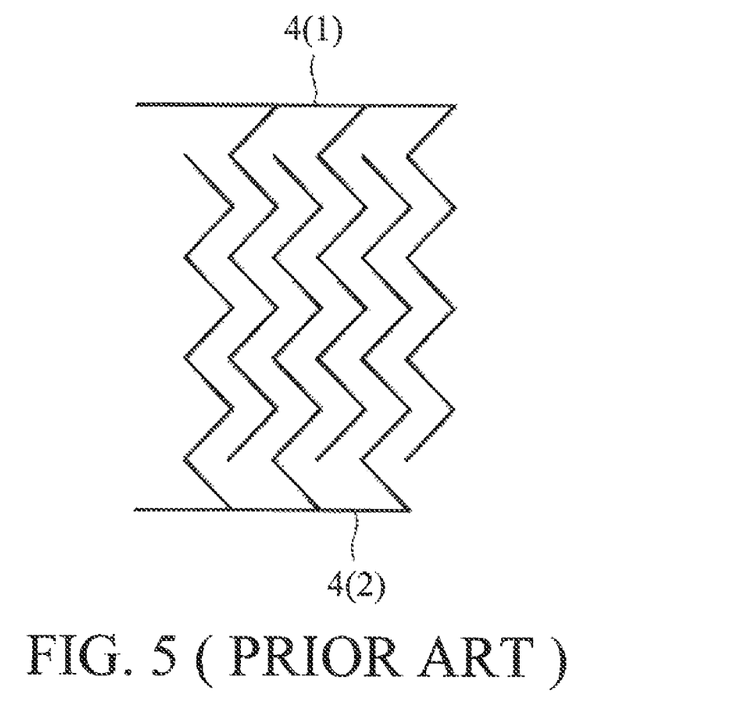
FIG. 5 a schematic drawing of yet another general FFS electrode structure.

The electrodes 4 in the known devices can have different shapes and designs. Some of the most common shapes are shown in FIGS. 3-5. In FIG. 3, the electrodes are comb-shaped and two of these comb-shaped electrodes which may correspond to the electrodes 4(1), 4(2) of FIG. 1 are provided with interdigitating teeth, i.e. each tooth of an electrode (4(1) is positioned between adjacent teeth of another electrode (4(2). So, the structure shown in FIG. 3 may be applied in the IPS technology shown in FIG. 1. However, it can equally well be applied in the FFS technology of FIG. 2. In such a FFS embodiment, one of the comb-shaped electrodes can be common electrode 6 and the other electrode can be a pixel electrode 4.

In FIG. 4 an alternative design of such an electrode structure is shown, in which the teeth of the electrodes 4(1), 4(2) (or 4, 6) have a chevron structure. The chevron structure is preferably such that the mutual distance between opposing teeth of the two different electrodes 4(1), 4(2) (or 4, 6) is substantially constant.

In FIG. 5, the teeth have a zigzag (or "snake" type) shape. Again, the structure is preferably such that the mutual distance between opposing teeth of the two different electrodes 4(1), 4(2) (or 4, 6) is substantially constant.

Thus, many different shapes of electrodes have been tried and many shapes have been explored in order to create an ideal electrostatic field for orienting liquid crystals.

It was found that electrode structures with polygon shaped surfaces provide a suitable electrical field supporting a fast response time or a better viewing angle. In FIGS. 6-11, several examples of such electrodes with polygon shaped surfaces in accordance with the invention are shown. Furthermore, in these particular embodiments, the electrode surfaces are arranged in a tiled fashion. A suitable design has an equilateral hexagon shape.

Figure 6:
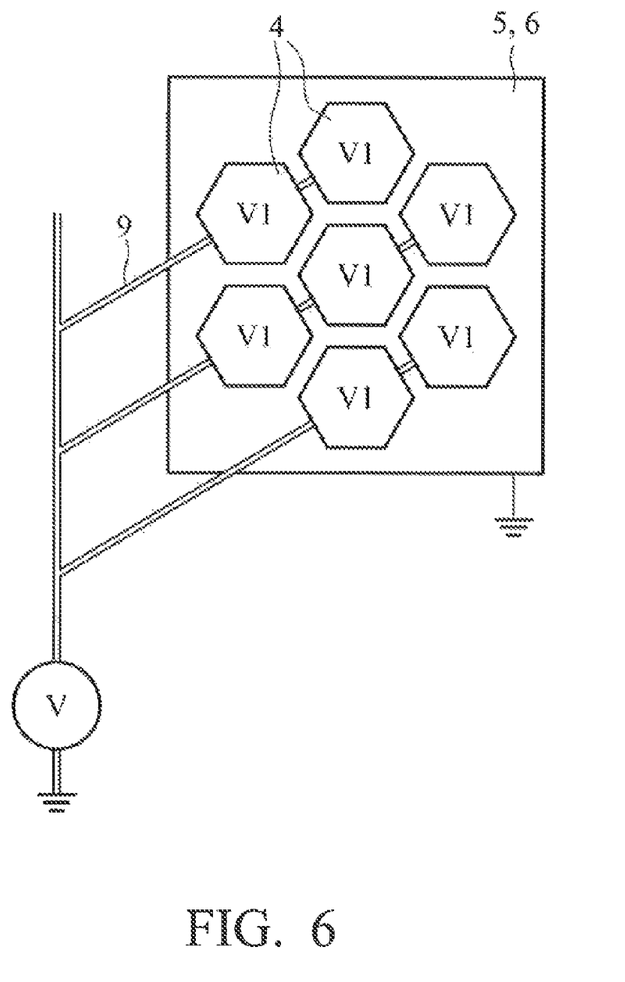
FIG. 6 a top view of an electrode structure of an embodiment of the invention.

FIG. 6 shows an embodiment of an FFS structure with one pixel having a square common electrode 6 with insulating layer 5 on top of it and the polygon-shaped pixel electrodes 4 of the invention have hexagon shaped surfaces. FIG. 6 shows 7 such polygon-shaped pixel electrodes 4. However, it is observed that, in reality, a pixel may have many more such pixel electrodes 4, for instance some tens. This also holds for the other embodiments. These pixel electrodes 4 are, as mentioned, arranged in a tiled fashion. Furthermore, these hexagons are in this embodiment equilateral and regularly spaced. Furthermore, they have substantially equal interspacing. In this embodiment, the hexagons are all operationally coupled to a common voltage source V via electrode leads 9 providing a voltage V1. The voltage source V may be a display driver.

The structure of the electrode leads 9 may be as shown in FIG. 6. However, alternatively, it is possible to couple one hexagon shaped pixel electrode 4 to voltage source V and to interconnect the hexagons using electrode leads. The applied electrode lead structure may depend on the desired fringing field. The electrode leads 9 are made of a transparent material like ITO so as to not to block transmission of light through the electrode leads 9.

A feature of the tiled structure as shown is that the mutual distance between adjacent tiles is substantially constant along all those edges of the pixel electrodes 4 that are facing an adjacent pixel electrode. In other words, each electrode 4 has a polygon-shaped electrode surface and a plurality of electrode edges. The electrodes 4 are arranged such that if an electrode edge is facing an electrode edge of an adjacent electrode then the electrode edge and the electrode edge of the adjacent electrode define a distance which is substantially constant along the entire electrode edge. Although this distance may have the same value over an entire pixel, this does not need to be necessarily so. Other polygon shapes may be used provided that this feature is applied. This feature helps creating a regularly shaped fringing electric field between adjacent pixel electrodes 4 towards common electrode 6 which supports good viewing angle behaviour.

Figure 7:
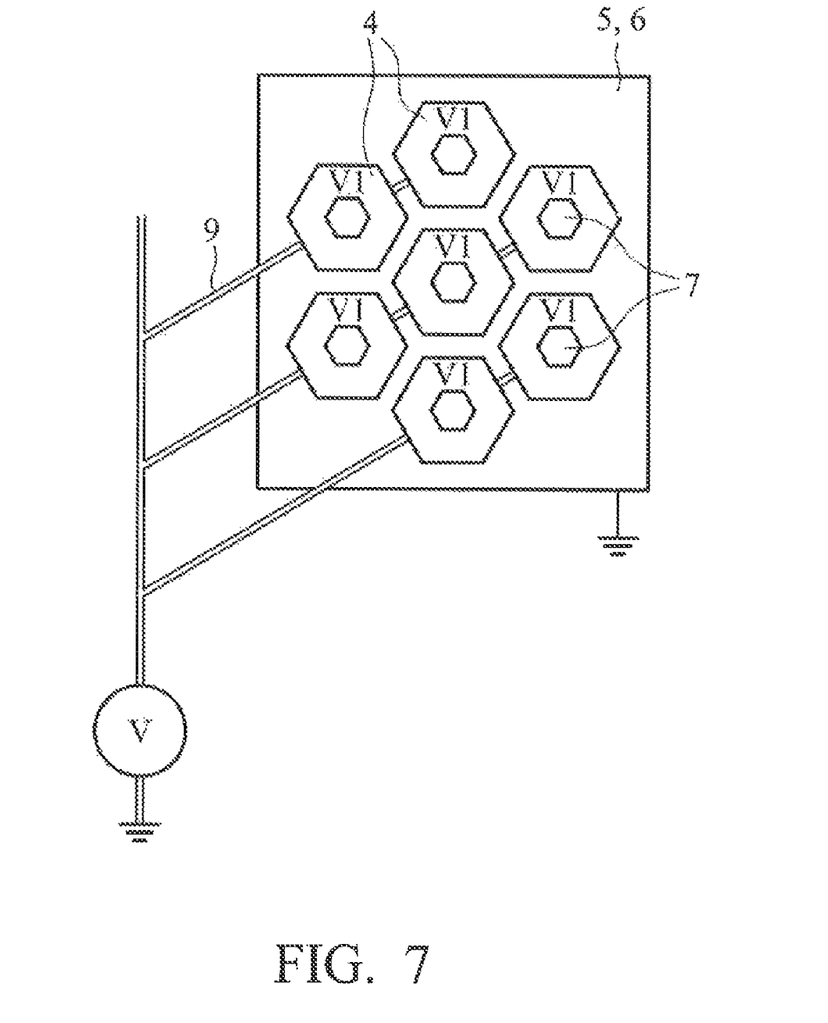
FIG. 7 a top view of an alternative electrode structure of an embodiment of the invention.

In FIG. 7, a further embodiment of the pixel electrode structure of FIG. 6 is shown. Again, the polygon-shaped pixel electrodes 4 have hexagon shaped outer edges. Again, the polygon-shaped pixel electrodes 4 are connected to voltage source V which, via electrode leads 9, provides a voltage V1. Again, the voltage source V may be a display driver. However, in contrast to FIG. 6, the hexagon shaped pixel electrodes 4 have an opening 7. These openings 7 may have been made by removing portions of the pixel electrodes 4 or, alternatively, by not making them anyway. In this embodiment, the openings 7 also have a hexagon shape. The openings 7 in the electrode surfaces of this embodiment thus have the same shape as the pixel electrodes 4 themselves. The openings 7 may be centred in the electrode surfaces. It is to be understood that the openings 7 may have other shapes as well, such as circles, squares, rectangles, or other polygon shapes.

The openings 7 provide additional space where fringing electrical field lines are generated between the pixel electrodes 4 and the common electrode 6. This increases the transmission capacity for light entering the device at substrate layer 2 (cf. FIGS. 1 and 2).

Figure 8:
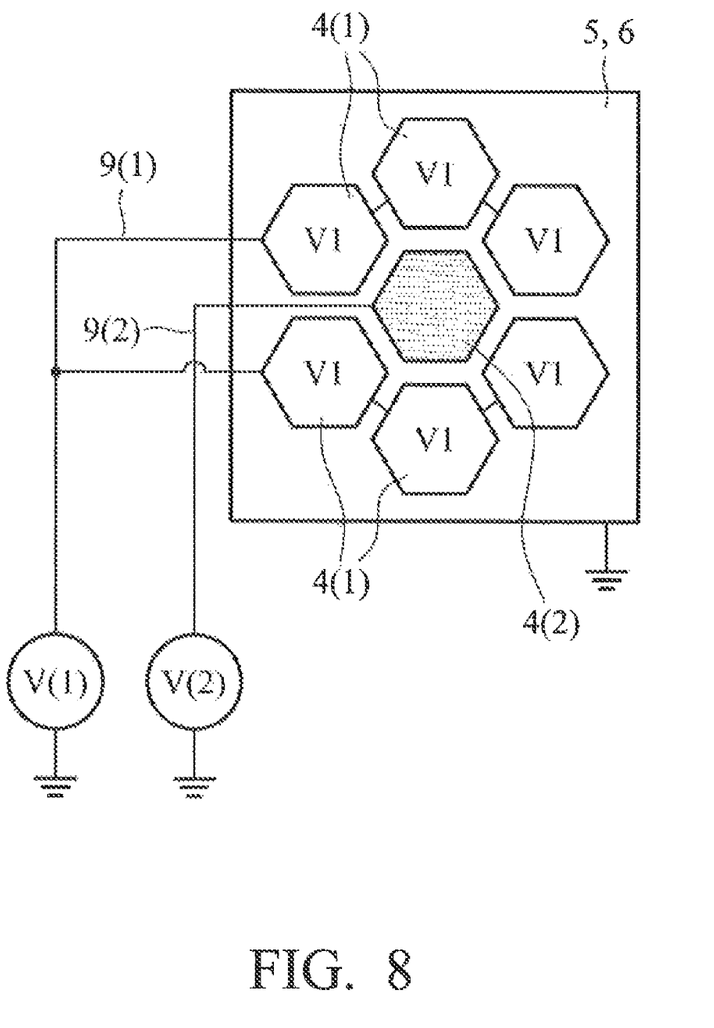
FIG. 8 a top view of yet another electrode structure of an embodiment of the invention.

FIG. 8 also shows a FFS structure. In FIG. 8, essentially, a same configuration of electrodes 4 as in FIG. 6 is depicted. In this embodiment, however, different pixel electrode 4(1), 4(2) are connected to different voltages: a first group of electrodes 4(1) is connected to a voltage source V(1) via electrode lead 9(1) providing voltage V1, whereas a second group of electrodes 4(2) is connected to a further voltage source V(2) via electrode lead 9(2) providing a different voltage V2. The voltage sources V(1) and V(2) may be display drivers. This structure provides the possibility of changing the direction of the electrical field lines of the fringing field in the pixel on a more local basis, thus providing more freedom to influence the viewing angle of the pixel. Furthermore, such an electrode structure will enable to influence other electro-optical behaviour of the pixel such as the response time.

FIG. 8 shows an implementation where pixel electrodes 4(1), 4(2) that should have different potentials are connected to different voltage sources V(1), V(2) via different electrode leads 9(1), 9(2). Alternatively, pixel electrodes 4(1) are connected to voltage source V(1) and capacitive elements are provided between pixel electrodes 4(1) and 4(2) such as to capacitively couple them and provide pixel electrodes 4(2) with a lower potential than pixel electrodes 4(1). Of course, in such an embodiment there is fixed coupling between the voltages V1 and V2 and there is less freedom of varying the viewing angle.

Figure 9:
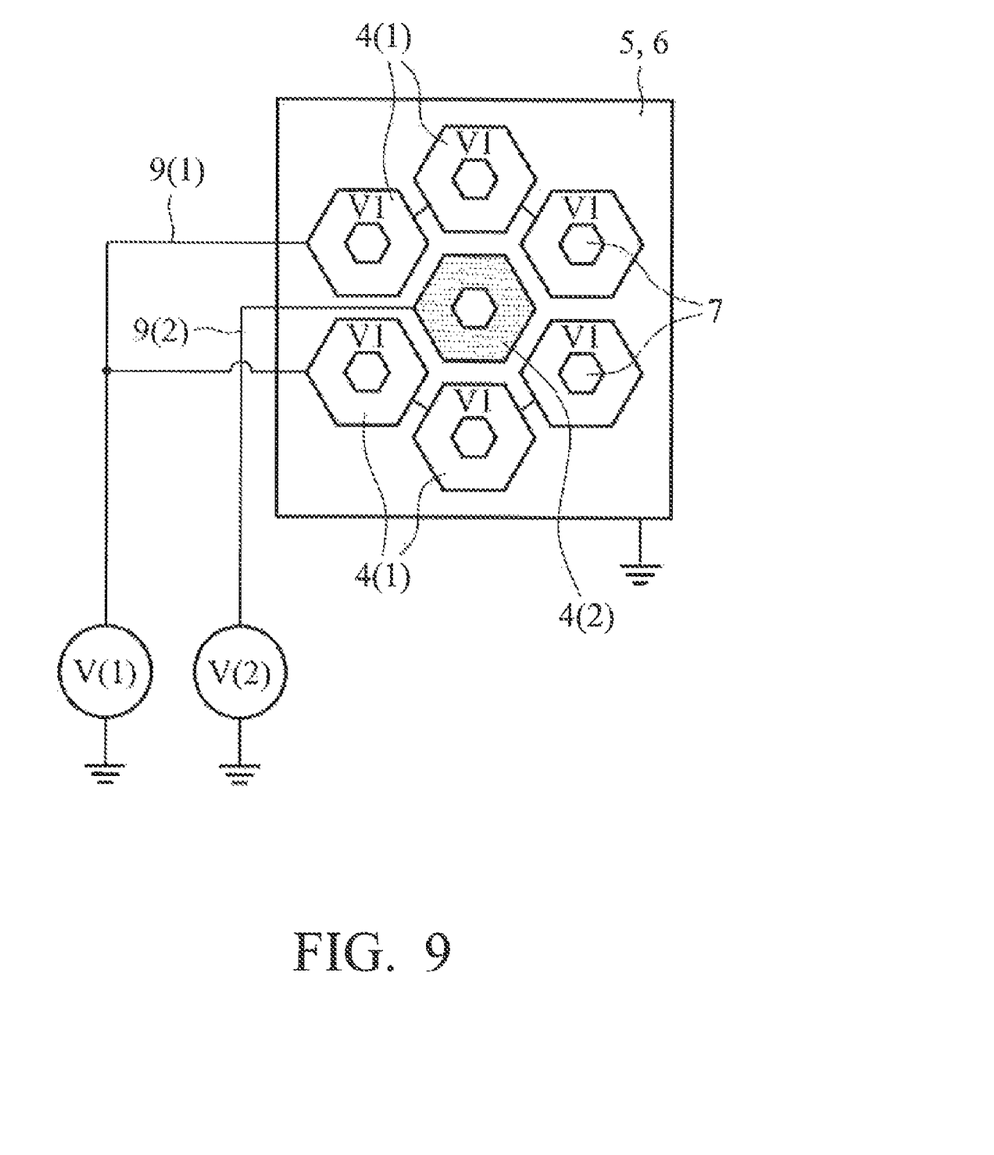
FIG. 9 a top view of a combination of the electrode structures of FIG. 7 and FIG. 8.

In FIG. 9, the embodiments of FIGS. 7 and 8 are combined. The pixel electrodes 4(1) and 4(2) are provided with openings 7. The pixel electrodes 4(1) with openings 7 are held at a voltage V1, and pixel electrodes 4(2) are held at voltage V2.

As in the device of FIG. 7, in the device of FIG. 9 there is more space for electrical field lines between pixel electrodes 4(1), 4(2) and common electrode 6 thus improving the transmission capacity for light through the pixel.

Figure 10:
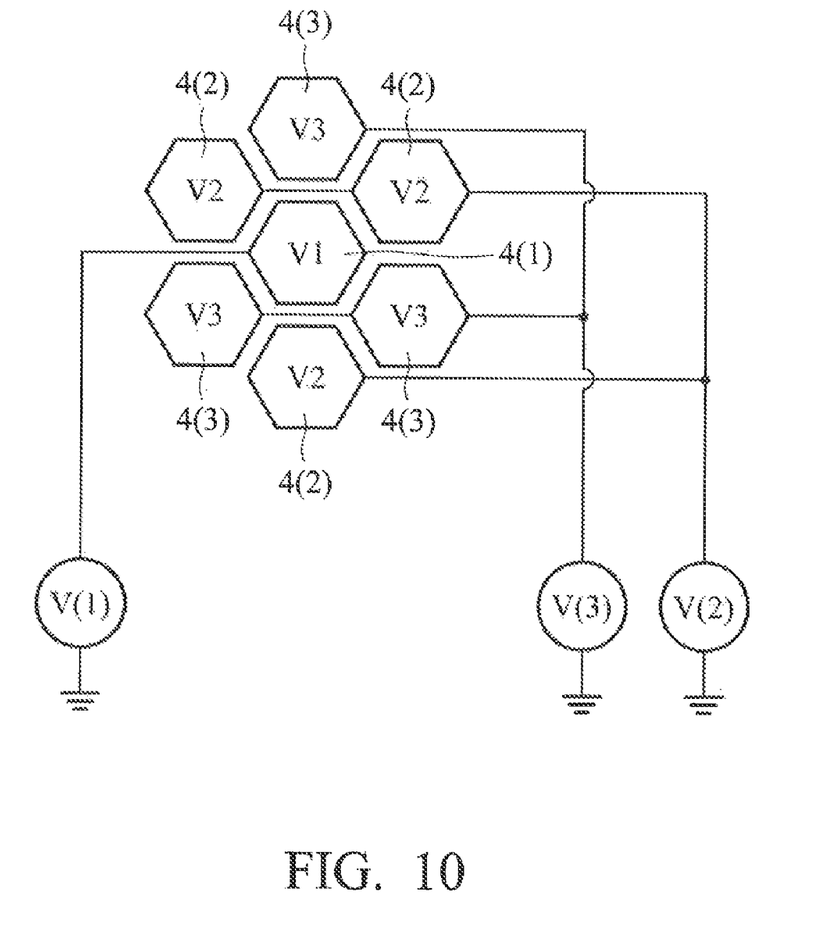
FIG. 10 a top view of the electrode structure of FIG. 6 with potential variations, and FIG. 11 an alternative electrode structure.

The invention can also be applied in IPS-LCD configurations. In FIG. 10, a pixel with the electrode structure of the invention is shown in an IPS-LCD configuration. In this embodiment, several electrodes are held at different voltages V1, V2 and V3 provided by three different voltage sources V(1), V(2), and V(3) which may be display drivers. In such an embodiment, a common electrode does not need to be present. Thus, it was found that it is possible to create different fringing fields and thus a way of influencing the fringing fields. In that way, it was found possible to further influence the viewing angle in this type of LCD devices.

Figure 11:
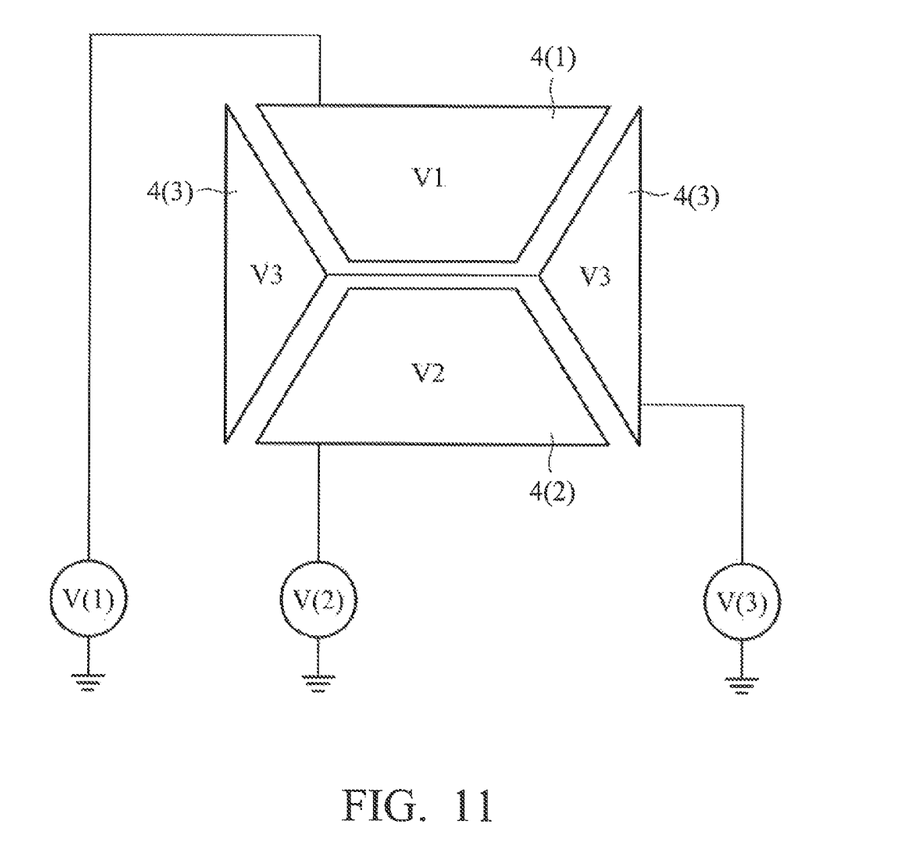

In FIG. 11, an alternative configuration of polygon-shaped electrode surfaces is shown for an IPS-LCD device. Again, a common electrode does not need to be present. In this embodiment of polygon-shaped electrodes the electrodes are tiled in a manner to fill a square pixel. In this embodiment, two electrodes with triangular surfaces 4(3) are combined with two electrodes with isosceles trapezoid surfaces 4(1), 4(2) and have substantially regular interspacing. So, again, a feature of the tiled structure as shown in FIG. 11 is that the mutual distance between adjacent pixel electrodes is substantially constant along all those edges of the pixel electrodes 4(i), i=1, 2, 3, ..., I, that are facing an adjacent pixel electrode. Together, these surfaces are here positioned to tile a square field or pixel. In this embodiment, different voltages V1, V2 and V3 are applied to the electrode surfaces: to that end, electrode 4(1) is connected to voltage source V(1), electrode 4(2) to voltage source V(2), and electrodes 4(3) to voltage source V(3). The voltage sources may be display drivers. Again, this provides the option of varying the different in-plane fields along the edges of the surfaces to further influence the viewing angle in this type of LCD devices.

FIG. 11 shows an implementation where electrodes 4(1), 4(2), 4(3) that should have different potentials are connected to different voltage sources V(1), V(2), V(3) via different electrode leads. Alternatively, only electrode 4(1) is connected to voltage source V(1) and capacitive elements are provided between electrodes 4(1) and 4(2), as well as between electrodes 4(1) and 4(3) such as to capacitively couple them and provide electrodes 4(2) and 4(3) with a lower potential than electrode 4(1). Of course, in such an embodiment there is a fixed coupling between the voltage sources V1 and V2, and between voltage sources V(1) and V(3) and there is less freedom of varying the viewing angle.

The basic structure of FIG. 11 can also be applied in a FFS structure. I.e., a common electrode 6 can be applied below the pixel electrodes 4(1), 4(2), 4(3) such that, in use, fringing fields are created between the pixel electrodes 4(1), 4(2), 4(3) and the common electrode 6, as explained above, for instance with reference to FIG. 2.

Then, the pixel electrodes 4(1), 4(2), 4(3) may have the same voltage, e.g., V1. However, alternatively, the pixel electrodes 4(1), 4(2), 4(3) may be connected to different voltage sources V(1), V(2), V(3) as shown in FIG. 11. As a further alternative, only pixel electrode 4(1) is connected to voltage source V(1) whereas the other pixel electrodes 4(2), 4(3) are capacitively coupled to pixel electrode 4(1), as explained above with reference to FIG. 11.

Moreover, in such a FFS embodiment, the pixel electrodes 4(1), 4(2), 4(3) may be provided with holes 7, like the holes 7 shown in FIGS. 7 and 9.

The device can be used in various LCD displays like transflective, reflective, transmissive, TV, mobile phone or PDA displays.

It will also be clear that the above description and drawings are included to illustrate some embodiments of the invention, and not to limit the scope of protection. Starting from this disclosure, many more embodiments will be evident to a person skilled in the art which embodiments are within the scope of protection and the essence of this invention and which are obvious combinations of prior art techniques and the disclosure of this patent.

What is claimed is:

1. A liquid crystal display device having pixels, each pixel comprising a lower substrate and an upper substrate with a liquid crystal material in between, each pixel also comprising an electrode structure between said lower substrate and said upper substrate, wherein said electrode structure comprises a plurality of pixel electrodes, each pixel electrode having a polygon-shaped electrode surface and a plurality of electrode edges and opposing electrode edges of adjacent pixel electrodes having a substantially constant distance therebetween along the entire length of the opposing electrode edges, and in each pixel, more than one of the pixel electrodes are coupled to a first voltage source and at least one of the remaining pixel electrodes are coupled to a second voltage source different from the first voltage source.

2. The liquid crystal display device according to claim 1, wherein said liquid crystal device is an in-plane switching device.

3. The liquid crystal display device according to claim 1, wherein said liquid crystal device is a fringe field switching device.

4. The liquid crystal display device according to claim 3, wherein said pixel electrodes have openings.

5. The liquid crystal display device according to claim 1, wherein said pixel electrodes have a substantially identical polygon-shaped electrode surface.

6. The liquid crystal display device according to claim 1, wherein each one of said pixel electrodes has a polygon shape selected from a group of polygon shapes comprising triangles, trapezoids and hexagons.

7. An electronic device comprising a liquid crystal display device according to claim 1.

8. The electronic device according to claim 7, wherein said electronic device is one of a transflective, reflective, transmissive, TV, mobile phone and PDA display.

* * * * *